March 26, 1963

V. OHARENKO

LITTER BOX

Filed Dec. 6, 1961

3,082,863

INVENTOR.
Vladimir Oharenko
BY
Fidler, Beardsley & Bradl
ATTORNEYS

3,082,863
LITTER BOX
Vladimir Oharenko, 904 N. Campbell Ave., Chicago, Ill.
Filed Dec. 6, 1961, Ser. No. 157,434
9 Claims. (Cl. 206—19.5)

This invention relates to a litter box to be placed under an automobile seat.

Since a substantial amount of refuse or waste material is accumulated in an automobile by the passengers, it is important to provide an economical, practical and readily usable container for such refuse in the automobile. Since the space underneath the seat of an automobile is rarely used and is in essence waste space, it is highly practical to use this space for a litter box.

An object of this invention is to provide a litter box of cheap and economical construction.

Another object of this invention is to provide a litter box which is adapted to fit beneath the seat of an automobile.

A further object of this invention is to provide a litter box that is adjustable in height so that it may fit within the space provided under most automobile seats.

A further object of this invention is to provide a litter box for use under an automobile seat and which has a closure that is resiliently urged against the seat.

A still further object of this invention is to provide a litter box for use under an automobile seat and which has a flap resiliently urged against the front of the seat.

A still further object of this invention is to provide a litter box for use underneath an automobile seat and which has a closure resiliently urged against the front of the seat and has means to retain the litter box in position beneath the seat.

Another object of this invention is to provide a litter box for use underneath an automobile seat and having means to position the litter box in proper location beneath the seat even when the seat is adjusted forwardly and rearwardly.

These and other objects and advantages will become more readily apparent as this description proceeds and is read in conjunction with the attached drawings in which.

Figure 1:
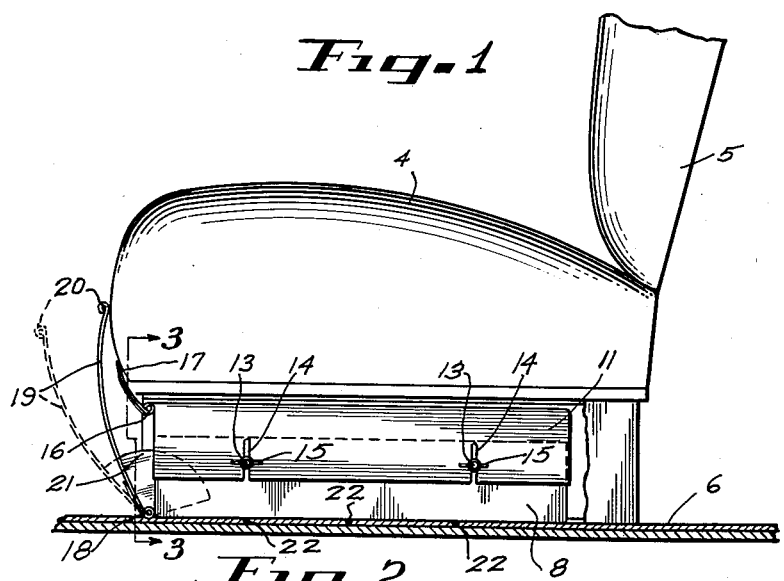
FIG. 1 is a side elevational view of the box and the end elevational view of an automobile seat.
Figure 2:
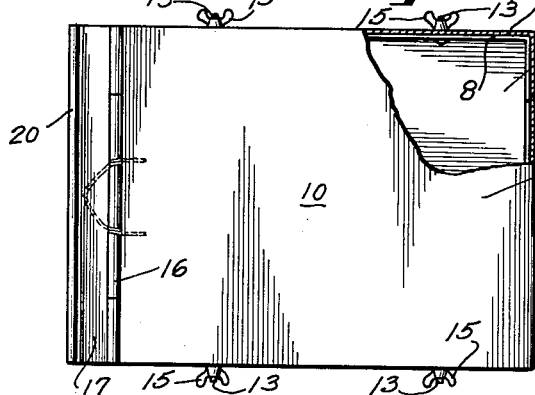
FIG. 2 is a top plan view of the box.

An automobile seat is indicated by 4, which is provided with usual back 5. The box of the present invention is adapted for positioning between seat 4 and floor 6.

The box consists of telescopically arranged lower and upper sections, each of a rectangular form. The lower section includes bottom 7, a pair of side walls 8, and the rear wall 9. The upper section consists of the upper horizontal wall 10, a pair of side walls 11 and the rear wall 12. The dimensions on horizontal plane of the lower section are smaller than those of the upper section so that the lower section is capable of reception within the upper section, through the open bottom of the latter. By virtue of this arrangement the two sections are capable of telescopic adjustment in the vertical plane for the purpose of either increasing or decreasing the capacity of the box or conforming the same to the particular space between seat 4 and floor 6 of an automobile.

The means for rigidly interengaging the two sections of the box in their telescopically adjusted relation include a plurality of screw bolts 13, which are rigidly affixed to sides 8 and from which the same laterally project. Sides 11 in the upper section are provided with vertical slots 14, one for each screw bolt 13, whereby the upper section may be shifted vertically in each direction. When a proper telescopic adjustment of the two sections of the box has been effected, the wing-nuts 15 are then tightened for the purpose of rigidly interlocking the two sections in their adjusted relation.

The front end of the box as defined by the two sections aforesaid is open.

Mounted upon the spring-actuated hinge 16, which is positioned along the front edge of the top horizontal wall 10 of the upper box section is flap 17, somewhat arcuate on transverse cross-section, directing the free end of the flap to the rearward direction, in order that the flap may snugly fit and overlie the adjacent front edge portion of seat 4, as is seen in FIG. 1. Thus, flap 17 defines a guard preventing refuse or the like from staining or soiling the lower edge portion of the seat as well as from moving in a rearward direction above the box.

Affixed to a spring actuated hinge 18, which is formed along the front edge of the bottom wall 7 of the lower box section, is closure 19, which, at its upper edge, is provided with bead 20 which may be easily grasped in order to shift said closure 19 in a forward direction, as indicated by dotted lines in FIG. 1, for thereby effecting an opening between said closure 19 and the seat, through which refuse may be thrown into the box.

In a rigid association with each end of said closure 19 is a sector-like plate 21, which is in a contactual relation with the inner face of each side wall 8 of the inner section of the box, and along which the same shifts when closure 19 is brought to an open position or when said closure assumes automatically a closed position by virtue of the operation of the spring-actuated hinge 18. Said plates 21 function as guards for preventing refuse thrown into the box on opening closure 19 from falling out of the box in a lateral direction.

In its normally closed position bead 20 forms a tight fit with the front edge of seat 4, said bead 20 being disposed above the upper edge of flap 17.

Pins or prongs 22 may be provided at the bottom of lower box section to engage an automobile floor, thus preventing the box from shifting in any direction.

Figure 4:
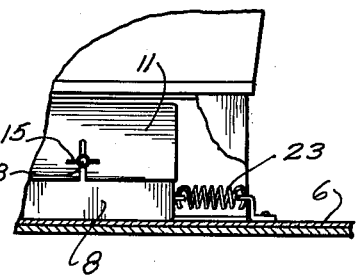
FIG. 4 is a partial view showing another method of securing the box in place relative to the automobile seat.
Figure 3:
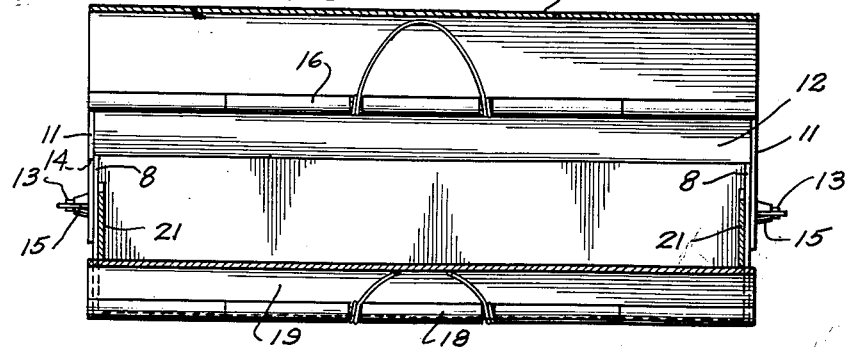
FIG. 3 is a cross-sectional view taken on line 3—3 of FIG. 1.

In FIG. 4 I have shown a modified version of means to secure the box in place relative to the floor and seat of the automobile. A spring 23 is secured between the rear face of the box and floor 6. This spring 23 exerts less force on the box than is exerted by spring-actuated hinge 16 and spring-actuated hinge 18. With the arrangement shown in FIG. 4, the seat may be moved forwardly or rearwardly and yet the box will be maintained in proper position for use.

Various changes and modifications may be made in the litter box of my invention without departing from the scope of my invention as defined in the following claims.

I claim:

1. In combination with a vehicle seat which is mounted on the floor of a vehicle to provide a space between the seat and the vehicle floor, a litter box arranged within said space, said box comprising a lower section and an upper section, said sections being telescopically arranged whereby the height of said box may be adjusted to the space between the vehicle and floor, means for rigidly fixing said sections together, a closure for the front end of said box and spring means urging said closure into closed position with said closure engaging the front of said seat.

2. The litter box of claim 1 and further including a flap secured to the front edge of said upper section, and spring means urging said flap into engagement with the front of said seat for preventing refuse thrown into the box from soiling the lower edge portion of the seat.

3. A litter box as defined in claim 1 and including pins provided on said lower section and engaging said floor to prevent the box from shifting.

4. A litter box as defined in claim 1 and including a spring secured between said box and said floor and urging said box rearwardly under said seat.

5. In combination with a vehicle seat secured to the front of a vehicle, a litter box adapted to fit beneath said seat and between said seat and said floor comprising, a rectangular body portion and a front open end, a closure for said front open end secured along the lower edge of said body portion, spring means urging said closure into a position closing said open end and against the front edge of said seat, a flap secured to said body portion along the top of said one open end, said flap overlying the adjacent front edge portion of the seat, and spring means to urge said flap against the adjacent front edge portion of said seat.

6. The litter box of claim 5 and further including pins on said box engageable with said floor to prevent the box from shifting.

7. The litter box as defined in claim 5 and further including a spring secured between said box and said floor and adapted to urge said litter box in a rearward direction underneath said seat.

8. The litter box as defined in claim 1 and including a pair of sector-like plates, one attached at each end of said closure and movable therewith for preventing refuse thrown into the box on opening of said closure from falling out of the box in a lateral direction.

9. The litter box as defined in claim 5 and including a pair of sector-like plates, one attached at each end of said closure and movable therewith for preventing refuse thrown into the box on opening of said closure from falling out of the box in a lateral direction.

References Cited in the file of this patent
UNITED STATES PATENTS

| | | |
|---|---|---|
| 601,744 | Wells | Apr. 5, 1898 |
| 2,931,550 | Wood | Apr. 5, 1960 |